UNITED STATES PATENT OFFICE.

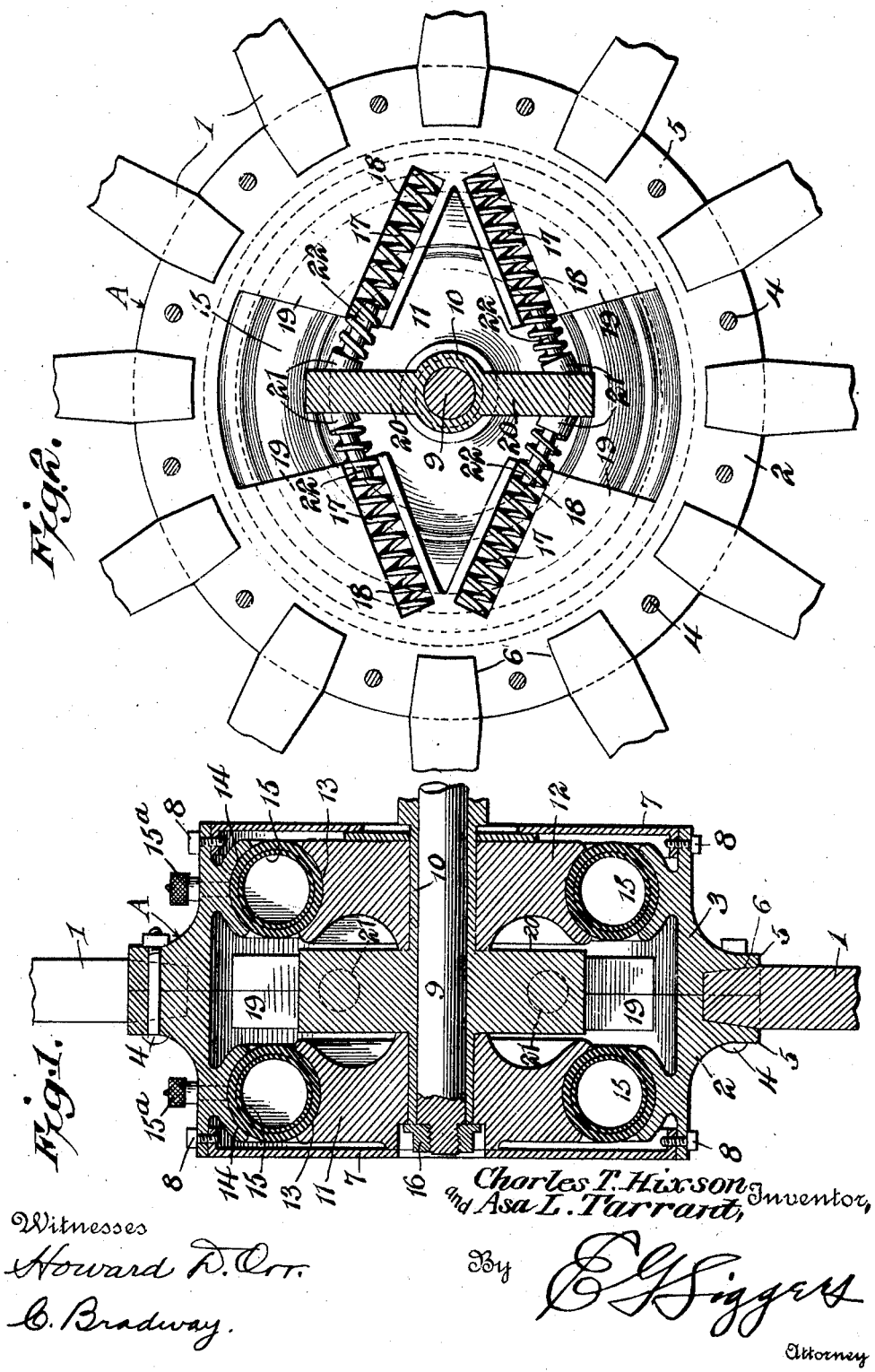

CHARLES TURNEY HIXSON AND ASA LAFAYETTE TARRANT, OF RINGWOOD, OKLAHOMA.

AUTOMOBILE WHEEL-HUB.

976,802.  Specification of Letters Patent.  Patented Nov. 22, 1910.

Application filed April 10, 1909. Serial No. 489,099.

*To all whom it may concern:*

Be it known that we, CHARLES TURNEY HIXSON and ASA LAFAYETTE TARRANT, citizens of the United States, residing at Ringwood, in the county of Major and State of Oklahoma, have invented a new and useful Automobile Wheel-Hub, of which the following is a specification.

This invention relates to wheels for automobiles, and more particularly to a hub of that type composed of inner and outer sections with pneumatic cushioning devices between the sections and cushioning springs through which the driving power is transmitted.

The invention has for one of its objects to improve and simplify the construction and operation of devices of this character so as to be comparatively simple and inexpensive to manufacture, reliable and efficient in use, and of durable and substantial design.

With this and other objects in view, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a vertical section of the hub taken centrally through the axis of rotation. Fig. 2 is a central transverse section of the hub.

Similar reference characters are employed to designate corresponding parts throughout the views.

Referring to the drawing, A designates the outer section of the hub to which the spokes 1 are rigidly connected. This outer section is in the form of a cylindrical housing or box composed of two parts 2 and 3 divisable in a plane transverse to the axis of rotation, and these parts are secured together by bolts or other fastenings 4, there being an annular flange 5 surrounding the box or casing and provided with sockets 6 for receiving the roots of the spokes. The parts 2 and 3 are annular in form and each is provided with a cover plate in the form of a disk 7 secured in place by screws 8 or other fastenings, whereby the casing A forms an approximately dustproof housing.

Extending centrally of the casing is the axle spindle 9 which may be fixed or rotatable, and mounted thereon is the axle sleeve 10 which is keyed to the axle 9 in case the latter is of live type, or which is free to move on the axle when the latter is stationary and the wheel is driven by power imparted to the sleeve 10. On the ends of the sleeve are spaced disks 11 and 12 which are peripherally grooved to form concave seats 13, arranged opposite concave seats 14 on the outer section of the hub, and between each pair of adjacent seats is arranged an annular pneumatic tube 15 which permits of relative movement between the inner and outer sections of the hub, said tubes having valve stems 15$^a$. The inner section comprises the sleeve 10 and disks 11, 12, which latter are mounted to freely turn on the axle sleeve with the outer section of the hub, so that the cushioning tubes 15 will not be subjected to unnecessary wear, as would be the case if the disks 11, 12 were fixed on the sleeve 10. The parts of the hub are held in assembled position by a nut 16 threaded on the axle spindle and engaging the axle sleeve, as shown.

Power is transmitted from one section of the hub to the other by means of strong helical springs 17 arranged in passages or pockets 18 in internal lugs 19 arranged on the outer section of the hub centrally between the cushion tubes 15. The sleeve 10 is provided with a pair of radial arms forming an abutment 20 disposed diametrically of the sleeve and having its opposite surfaces flat and parallel. The outer extremities of this abutment are free to move between the lugs 19 that are spaced apart such a distance as to constitute stops with which the abutment engages for limiting the relative rotary movement between the inner and outer sections. The inner ends of the springs are provided with members or shoes 21 that slidably engage the flat sides of the abutment 20, the shoes having stems 22 extending into the springs. In the present instance, four springs are shown, and they are arranged in the outline of a rhombus having its center coincident with the center of the hub, there being a pair of springs on each side of the diametrically-arranged abutment of the sleeve 10 and converging outwardly from the abutment with their outer ends adjacent each other. As the sleeve 10 is turned, the abutment formed by the arms 20 will transmit power to the outer section of the hub through two of the diagonally-arranged springs, which will be thereby compressed, while the other two diagonally-arranged springs will expand. When the wheel is to be reversed, the springs formerly expanded will become compressed while the other springs will expand when the pressure is removed from them. It will thus be seen that power can be transmitted from one section of the hub to the other without perceptible jar, and the inner sections can freely shift in a vertical plane, due to obstructions in the road surface without shocks being transmitted to the vehicle owing to the shock-absorbing pneumatic tubes 15. The various parts of the hub are comparatively simple and inexpensive and can be easily and readily assembled, and the internal parts of the hub are perfectly housed so as to be protected from injury.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims appended hereto.

Having thus described the invention, what we claim as new, and desire to secure by Letters Patent, is:—

1. A wheel hub comprising an outer annular section, an inner section, cushioning means between the sections, a diametrically-arranged abutment on the inner section having flat sides, a pair of springs at each side of the abutment and mounted on the outer section in angular relation to each other, and a shoe carried by each spring and slidably bearing on the flat sides of the abutment.

2. A hub comprising an outer section in the form of a housing, an inner section, pneumatic cushioning devices between the sections, a diametrically-arranged abutment on the inner section, internal lugs on the outer section spaced apart to constitute stops between which the extremities of the abutment move, said lugs having spring-receiving pockets, straight springs disposed in the pockets and projecting therefrom, said springs being arranged in the form of a rhombus with the center thereof coincident with the axis of rotation, and members on the projecting ends of the springs engaging and independently movable on the opposite sides of the abutment.

3. A wheel hub comprising an outer section, an inner section, cushioning means between the sections, an axle connected with the inner section, oppositely-disposed members on the axle having parallel opposite sides, two pairs of springs carried by the outer section, and devices carried by the springs for slidably engaging the parallel sides of the oppositely-disposed members the devices at opposite sides of said members being independent of each other.

4. A wheel hub comprising a pair of annular members detachably connected and forming an outer section, internal seats on the members, a pair of spaced disks arranged concentrically within the said section, seats on the disks arranged opposite the first-mentioned seats, pneumatic cushioning elements engaging the seats, a sleeve on which the disks are mounted for independent rotation and coöperating therewith to form an inner section, an axle on which the sleeve is mounted, a diametrically-arranged abutment fixed on the sleeve and disposed between the disks to form a spacer therefor, internal lugs arranged on the outer section in a plane coincident with the abutment and said lugs being spaced apart to form stops between which the abutment moves, said lugs having spring-receiving pockets, pairs of oppositely acting straight springs disposed in the pockets with their outer ends projecting therefrom, said springs being disposed to form the outline of a rhombus, of which the said abutment is one of the diameters and the center of the rhombus being coincident with the axle, and members carried by the projecting ends of the springs and slidably engaging the opposite sides of the abutment, the members of one pair of springs being simultaneously movable outwardly on the abutment and the members of the other pair simultaneously movable inwardly as the sections of the wheel change to and from concentric position and the members being slidable independently on the abutment during relative rotary movement between the wheel sections.

In testimony, that we claim the foregoing as our own, we have hereto affixed our signatures in the presence of two witnesses.

CHARLES TURNEY HIXSON.
ASA LAFAYETTE TARRANT.

Witnesses:
ROBERT F. CAWTHON,
WILLIAM WALT.